United States Patent [19]  
Hoepfl et al.

[11] 4,041,972  
[45] Aug. 16, 1977

[54] HYDRAULIC STACK VALVE ASSEMBLY

[75] Inventors: Joseph R. Hoepfl, Greenfield; Gerardus M. Ballendux, Waukesha, both of Wis.

[73] Assignee: Allis-Chalmers Corporation, Milwaukee, Wis.

[21] Appl. No.: 711,649

[22] Filed: Aug. 4, 1976

[51] Int. Cl.² .................. F15B 13/02; F16K 11/10
[52] U.S. Cl. ........................ 137/269; 137/608; 137/596
[58] Field of Search ............ 137/269, 270, 596, 608, 137/609

[56] References Cited  
U.S. PATENT DOCUMENTS

| | | | |
|---|---|---|---|
| 2,635,584 | 4/1953 | Jacques | 137/269 X |
| 2,838,059 | 6/1958 | Biazi | 137/269 X |
| 3,666,048 | 5/1972 | Zajaczkowski | 137/269 X |
| 3,840,047 | 10/1974 | Gibbins | 137/608 |

Primary Examiner—Alan Cohan  
Attorney, Agent, or Firm—Arthur L. Nelson

[57] ABSTRACT

A hydraulic stack valve assembly for controlling the pressure and flow of hydraulic fluid in a hydraulic system. The stack valve assembly includes a valve body including flow control valves and a valve cover including pressure control valves and a flow director plate sandwiched between the flow control and the pressure control valves for directing modulated and regulated pressurized fluid through the flow control valves to hydraulic actuators in the hydraulic system. The stack valve has the provision of interchanging the flow director plate to modify the valve assembly and adapting the valve for use of the desired number of flow control valves and the pressure control valves best suited to the hydraulic system in which the valve assembly is used.

10 Claims, 7 Drawing Figures

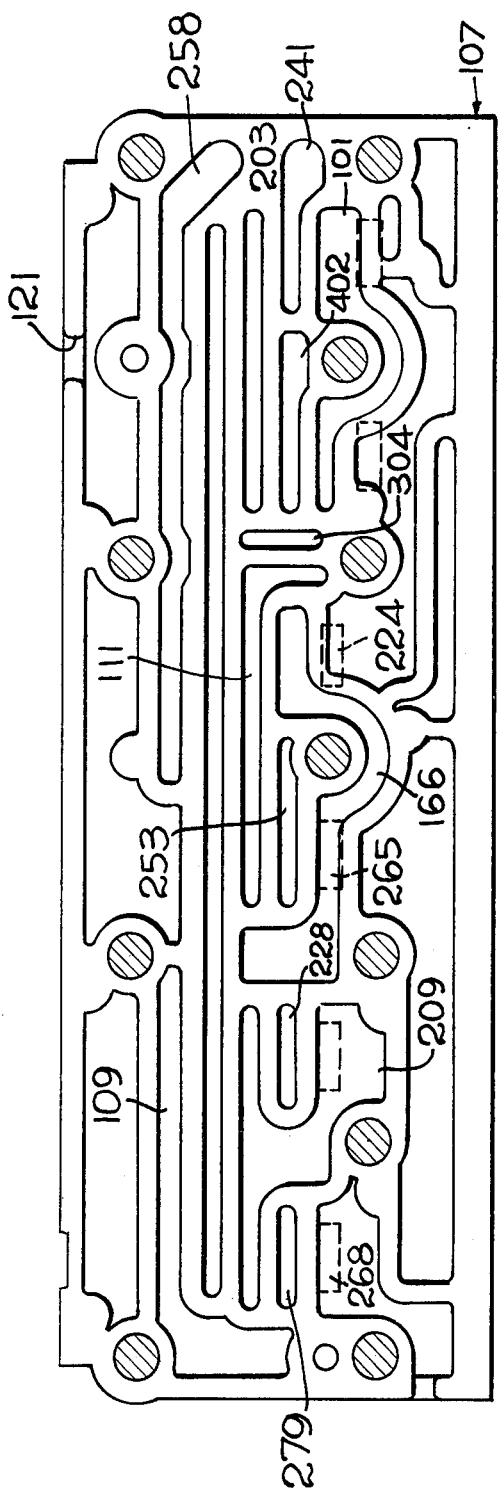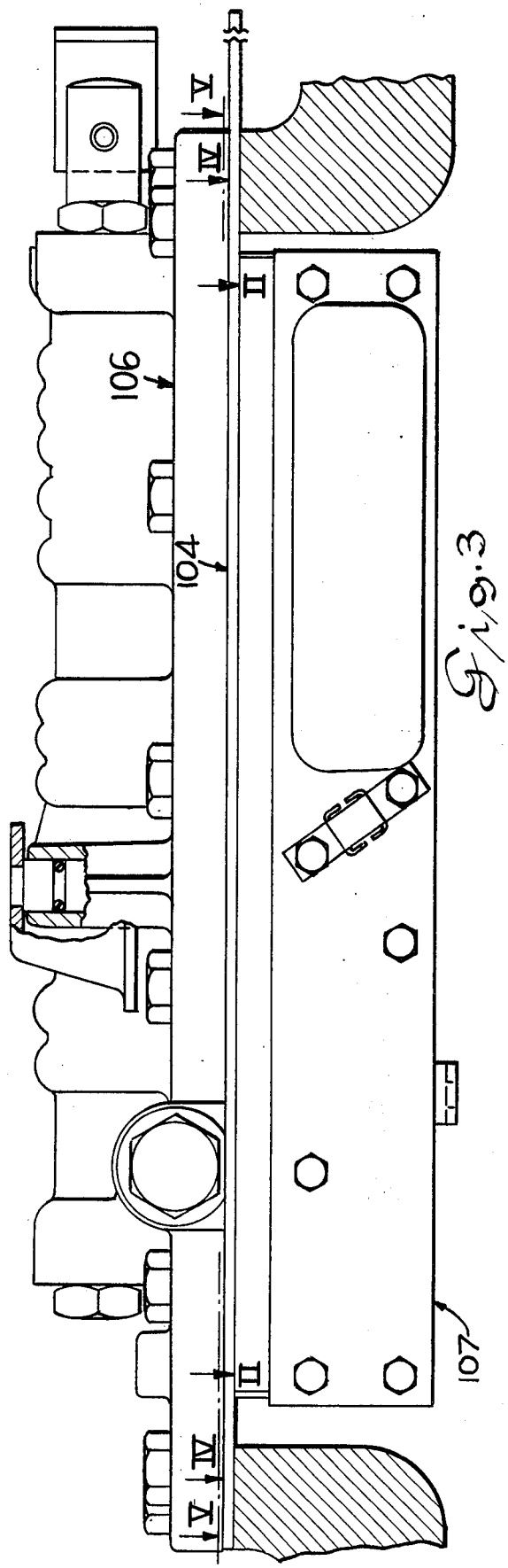
Fig. 2
Fig. 3

HYDRAULIC STACK VALVE ASSEMBLY

Hydraulic systems require a plurality of valves which include flow control and pressure control valves to regulate the pressure in a hydraulic system and modulate the pressure as it flows through the flow control valves to hydraulic actuators in a hydraulic clutch or brake. The number of clutches used in a hydraulic system may vary with the requirements of the hydraulic system. Conventional hydraulic systems employ pressure control valves and flow control valves which are often individually mounted on supporting structure and connected through external plumbing in the hydraulic system. While this arrangement does provide the desired hydraulic circuitry, the physical structure of this combination can be rather cumbersome and inconvenient to service and also this arrangement may be rather difficult to keep clean since the plurality of valves, conduits and supporting structure has a tendency to gather dirt and foreign material quite readily. Accordingly, this invention provides for the combination of all the flow control valves in one single casting such as the valve body. The pressure regulating valves are all incorporated in the valve cover. By incorporating the valves in a structure such as this, the supporting structure and the internal plumbing eliminates much of the external maze of flow control valves, pressure control valves and connecting conduits. A suitable flow director plate is sandwiched between the valve body and valve cover providing an integral structure in which the flow director plate directs the flow of fluid from the cover to the valve body and vice versa. By the selective use of various flow director plates having selected ports, the combination of one standard valve cover and one standard valve body can be used to provide a plurality of combinations of valves and passages for a hydraulic stack valve assembly.

It is an object of this invention to provide a stack valve for a hydraulic system.

It is another object of this invention to provide a stack valve including a valve body having flow control valves and a valve cover having pressure control valves and a flow director plate directing the flow of regulated and modulated pressurized fluid through the flow control valves for operating hydraulic actuators in the hydraulic system.

It is a further object of this invention to provide a hydraulic stack valve assembly with a plurality of flow control spool valves to selectively control the flow of fluid in the valve assembly. Pressure control valves regulate and modulate fluid transmitted through a flow director plate to the flow control valves which is then applied to a hydraulic actuator for operating a hydraulic clutch or brake as the requirements of the system might be.

The objects of this invention are accomplished by providing a valve body defining a plurality of flow control valves which are manually operated by the operator of the vehicle. A valve cover includes pressure control valves for regulating the pressure from the hydraulic pump and modulating the fluid as it is applied through the flow control valve to a hydraulic actuator. The valve cover and valve body are standard components while the flow director plate positioned between the valve body and valve cover forming an integral structure of the valve assembly selectively controls the flow from the pressure control valves to the flow control valves selected by the operator of the vehicle. By the use of selective flow director plates, the stack valve assembly can be adapted to various circuits and a select number of flow control valves in a valve assembly. Dummy spools are used in the flow control valves which are not in use in a circuit and spools forming lands and grooves to selectively direct the flow of fluid through the flow control are used in the flow control valves operating in the circuit. Accordingly, the initial cost of engineering, development and construction of the standard components can be absorbed over a greater number of valves and the unit cost of the hydraulic stack valve assembly is reduced. The unitary construction of the hydraulic stack valve assembly greatly improves the appearance of the valves and simplifies their operation on the tractor as compared to using individual valves with external plumbing which is used for conventional hydraulic systems.

A preferred embodiment of this invention is illustrated on the attached drawings.

FIG. 2 is a cross section view taken on line II—II of FIG. 3 showing the passages in the valve body;

FIG. 3 is a top view showing the hydraulic stack valve assembly mounted on the vehicle transmission housing;

Figure 1:
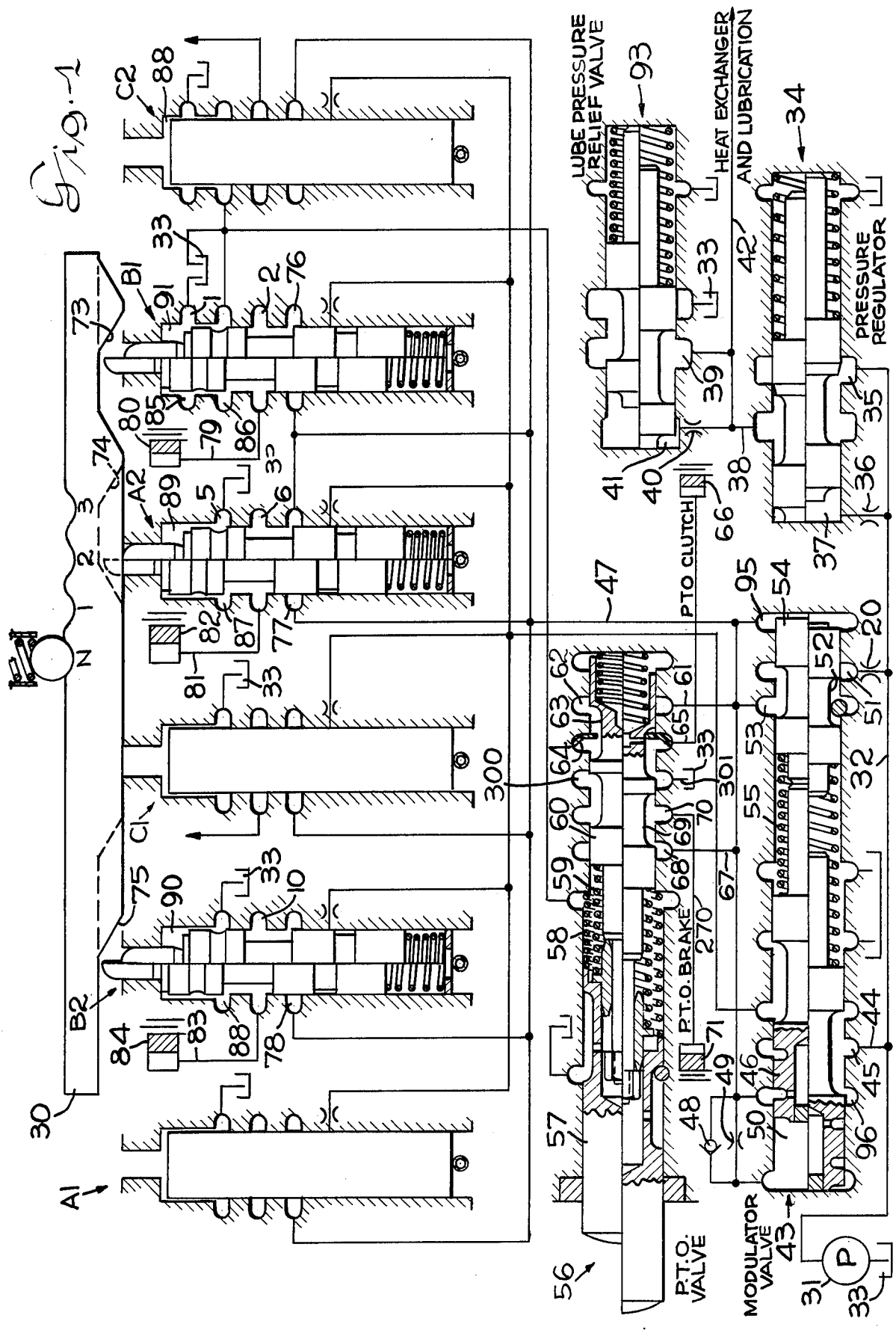
FIG. 1 illustrates a circuit diagram of the hydraulic system in which three of the flow control valves are used in the hydraulic system and three of the valves are dummy valves which are not used in the system as shown.

Referring to FIG. 1, the hydraulic circuit employs only three flow control valves. The flow control valves A1, C1 and C2 are not used in the hydraulic circuit. Although the connections of the hydraulic lines are shown in connection with these spools, the valves have dummy spools and are not actuated by the control rack 30. The flow control valves B2, A2 and B1 are used in the circuit and are actuated by control rack 30. The pump 31 operates to pressurize hydraulic fluid in the supply line 32. The pump 31 draws hydraulic fluid from the sump 33. The supply line 32 is connected to the pressure regulator valve 34 through the port 35. Orifice 36 supplies fluid to the chamber 37.

The pressure regulator valve 34 is connected to a hydraulic line 38 which connects to the port 39 through pressure relief valve 93 to bypass hydraulic fluid to the sump 33 under peak pressure conditions. The orifice 40 is connected to the chamber 41 in a pressure relief valve 93. The line 38 is also connected through the line 42 to a heat exchanger and lubricating circuit in the hydraulic system.

The supply line 32 is connected to the modulator valve 43 through the hydraulic line 44 and port 45. The hydraulic fluid is allowed to pass through the central opening in the plunger 46 to the hydraulic fluid modulator line 47. The hydraulic fluid modulator line 47 is connected through the check valve 48 and the orifice 49 to the chamber 50 of the left-hand end of the modulator valve.

The fluid supply line 32 is also connected through the orifice 20 to the port 51 through the annular recess 52 in piston 54 and port 53 in the position shown in the upper part of the valve when one of the clutches is operated. The port 53 is connected to the hydraulic modulating line 47 which supplies fluid to the flow control valve in operation. The plunger 46 is normally biased away from the piston 54 by the spring 55. When a flow control valve is open for engaging a clutch and the power shift transmission is operating, the valve position as shown in the upper half of the view of the modulator valve illustrates the operating position. When fluid is being modulated and the clutch is in initial engagement, the spool and piston positions are shown in the lower half of the modulator valve.

The power take off valve 56 is shown in section immediately above the modulator valve. The power take off valve (abbreviated PTO valve) includes the spool 57 biased in a left-hand position by the spring 58 and spring 59. The spring 59 biases the piston 60 in the right-hand position as shown in the upper part of the valve. In this position, pressurized fluid from the hydraulic line 61 of the modulator valve passes through the port 62 and the groove 63 in the PTO valve piston 60 through the port 64 and hydraulic line 65 to the hydraulic actuator 66 of the PTO clutch. The normal operating position for operating the PTO clutch is shown in the upper half of the section view of the PTO valve.

The lower half of the PTO valve shows the positions of the plunger 57 and spool 60 for disengagement of the PTO clutch by venting fluid from the hydraulic actuator 66 to sump 33. Pressurized fluid in the hydraulic line 67 flows through the port 68 and the angular groove 69 to the port 70 and to the hydraulic actuator 71 for actuating the PTO brake.

The control rack 30 is manually operated and includes cam surfaces 73, 74 and 75 for operating the flow control valves B1, A2 and B2, respectively. The hydraulic modulating line 47 supplies modulated fluid to the ports 76, 77 and 78 of the flow control valves B1, A2, and B2, respectively. Dummy spools are used in flow control valves C2, C1 and A1.

The hydraulic actuator line 79 supplies fluid to the hydraulic actuator 80 for the hydraulic clutch operated by flow control valve B1. The hydraulic actuator line 81 supplies fluid to the actuator 82 for the hydraulic clutch operated by the flow control valve A2. The hydraulic line 83 supplies hydraulic fluid to the hydraulic actuator 84 in the hydraulic clutch operated by the flow control valve B2. The ports 85, 86, 87 and 88 of flow control valves B1, A2 and B2 are all connected to sump 33. The dash pot chambers 188, 89 and 90 are formed with a clearance between the upper land of the spools and the bore. Fluid is received or discharged from the chamber to sump as the valve is actuated or deactuated.

The positioning of the flow control valves in the valve body 107 are indicated in FIG. 2. The PTO valve, the modulator valve, the relief valve, and the pressure regulator valve are located in the valve cover shown in FIG. 5.

In correlating the hydraulic circuit in FIG. 1 with the valve structure, the hydraulic supply line 32 as shown in FIG. 1 includes the passage 32 in the valve cover connected to a port in the transmission housing which supplies regulated fluid through the orifice 20 and the port 45 to the modulator valve 43. The passage 32 also leads to the port 35 in the pressure regulator valve which is also connected through passage 38 to the relief valve 93 which is in communication with passage 300.

Figure 5:
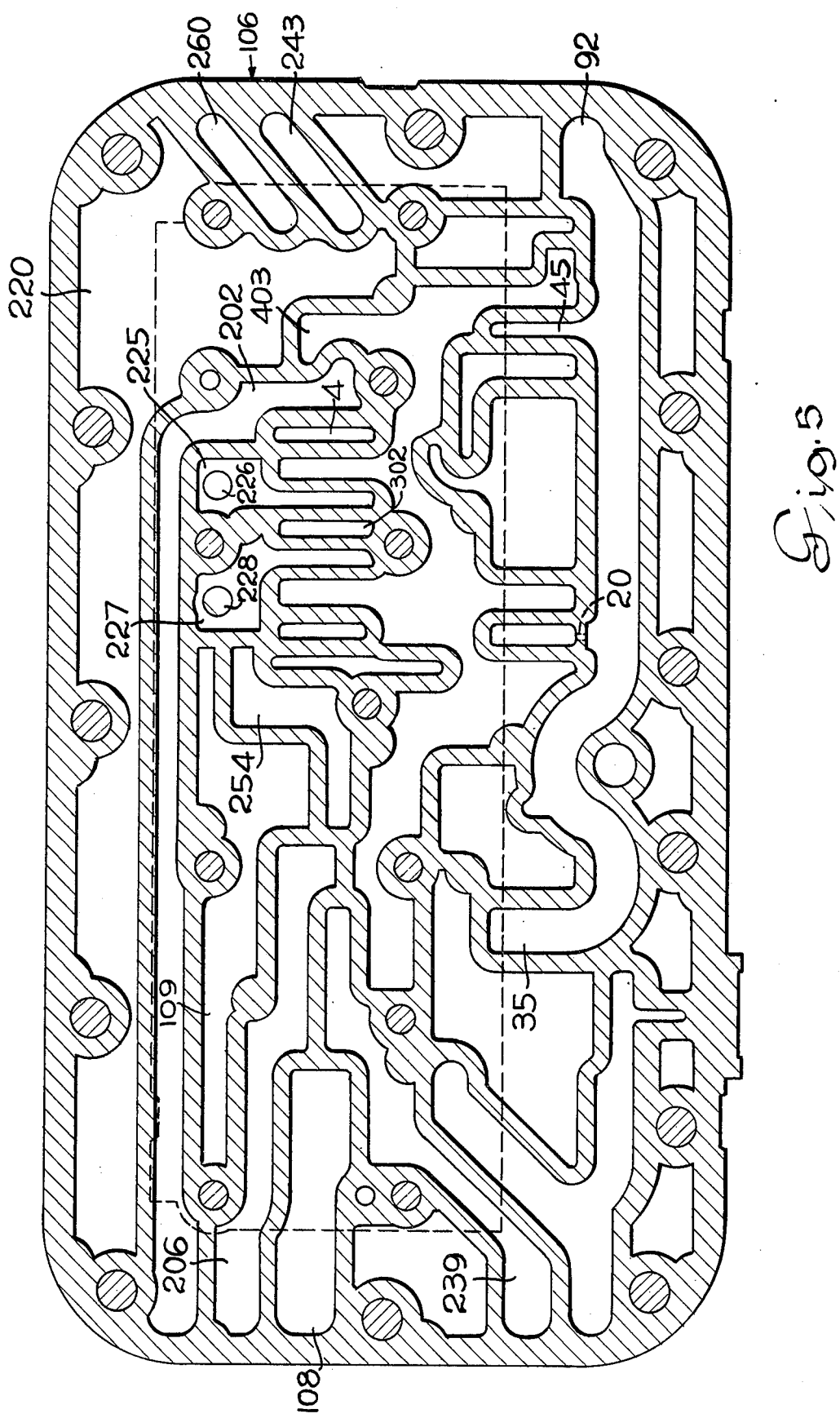
FIG. 5 is a cross section view taken on line V—V of FIG. 3 showing the passages in the valve cover of the hydraulic stack valve assembly.

A passage 3 shown in FIG. 5 forms a part of the pressure modulating line 47 and its connection to the ports 95, 53 and 96 of the modulator valve which in turn are connected to port 62 and 68 of the PTO valve. The hydraulic modulating line 47, as shown in FIG. 1, also includes the passage 3 of the valve cover 106 shown in FIG. 5 forming the opening 103 in the flow director plate 104 and the passage 203 of the valve body shown in FIG. 2. These passages carry modulated fluid to the flow control valve B1. The hydraulic modulating line 47 also includes port 9 in the flow director plate 104 and passage 209 in the valve body 107 to supply modulating fluid to the valve B2. The hydraulic modulating line 47 also includes the opening 110, opening 111, opening 117 and opening 118 in the flow director plate 104, as well as the passages 108 and 109 in the valve cover 106, as well as the passages 109 and 111 in the valve body 107. These passages supply modulated fluid to the flow control valve A2.

The hydraulic line 79 leading to the hydraulic actuator 80 of flow control valve B1 includes the passage 3 in the valve body 107, the opening 112 in the flow director plate 104 and the passage 202 in the valve cover 106. The passage 202 in the valve cover 106 is connected to the opening 114 in the flow director plate 104 which is connected to a port in the transmission housing for directing hydraulic fluid to the hydraulic actuator 80 in the power shift transmission.

The port 1 discharges into the sump 33 as shown in FIG. 1. The sump passages 101 shown in the valve body of FIG. 2 are connected to the opening 201 in the flow director plate 104 which flows into the sump passage 220 of the valve cover 106. The sump passage 220 is connected to the opening 120 in the flow director plate and discharge passage 121 of the valve body which discharge into the internal portion of the transmission housing and to sump.

The port 6 of the flow control valve A2 is connected to the hydraulic line 81 which transmits pressurized fluid to the hydraulic actuator 82. The port 6 and hydraulic line 81 include the passage 166 in the valve body 107, the opening 126 in the flow director plate 104 and the passage 206 in the valve cover 106 which discharges fluid through the opening 223 in the flow director plate 104 and into a port in the transmission housing to the hydraulic actuator 82 in the power shift transmission. The port 5, as shown in FIG. 1, is connected to the sump 33 through a vent 224 on the backside of the valve body 107, as shown in FIG. 2.

The port 10 of flow control valve B2 is connected through the hydraulic line 83 to the hydraulic actuator 84, as shown in FIG. 2. The port 10 on hydraulic line 83, as shown in FIG. 1, includes the passage 228 in the valve body 107, opening 229 in the flow director plate 104, and passage 239 in the valve cover 106 and port 230 in the flow director plate 104 which are in communication with the passage leading through the power shift transmission which leads to the hydraulic actuator 84 for engaging the clutch associated with hydraulic actuator 84.

The PTO valve 56 includes a sump port 300 which is connected to the hydraulic line 301 to sump 33. The port 300 and line 301, as shown in FIG. 1, includes passage 302 in the valve cover 106, passage 304 in the valve body 107 shown in FIG. 2 and opening 305 shown in flow director plate 104 of FIG. 4 which all lead to sump through the valve body passage 304 which extends out the backside of the valve body 107.

The hydraulic line 65 and port 62 are connected to the PTO clutch, as shown in FIG. 1. Port 62 and hydraulic lines 65 include passage 227 in the valve cover 106 shown in FIG. 5 which is connected to the opening 228 which in turn is connected to the hydraulic actuator for operating the PTO clutch.

Port 70 in hydraulic line 270 is connected to the hydraulic actuator 71 in the PTO brake as shown in FIG. 1. The port 70 and hydraulic line 270 include the passage 225 which is connected to opening 226 in the valve cover 106 as shown in FIG. 5.

Figure 6:
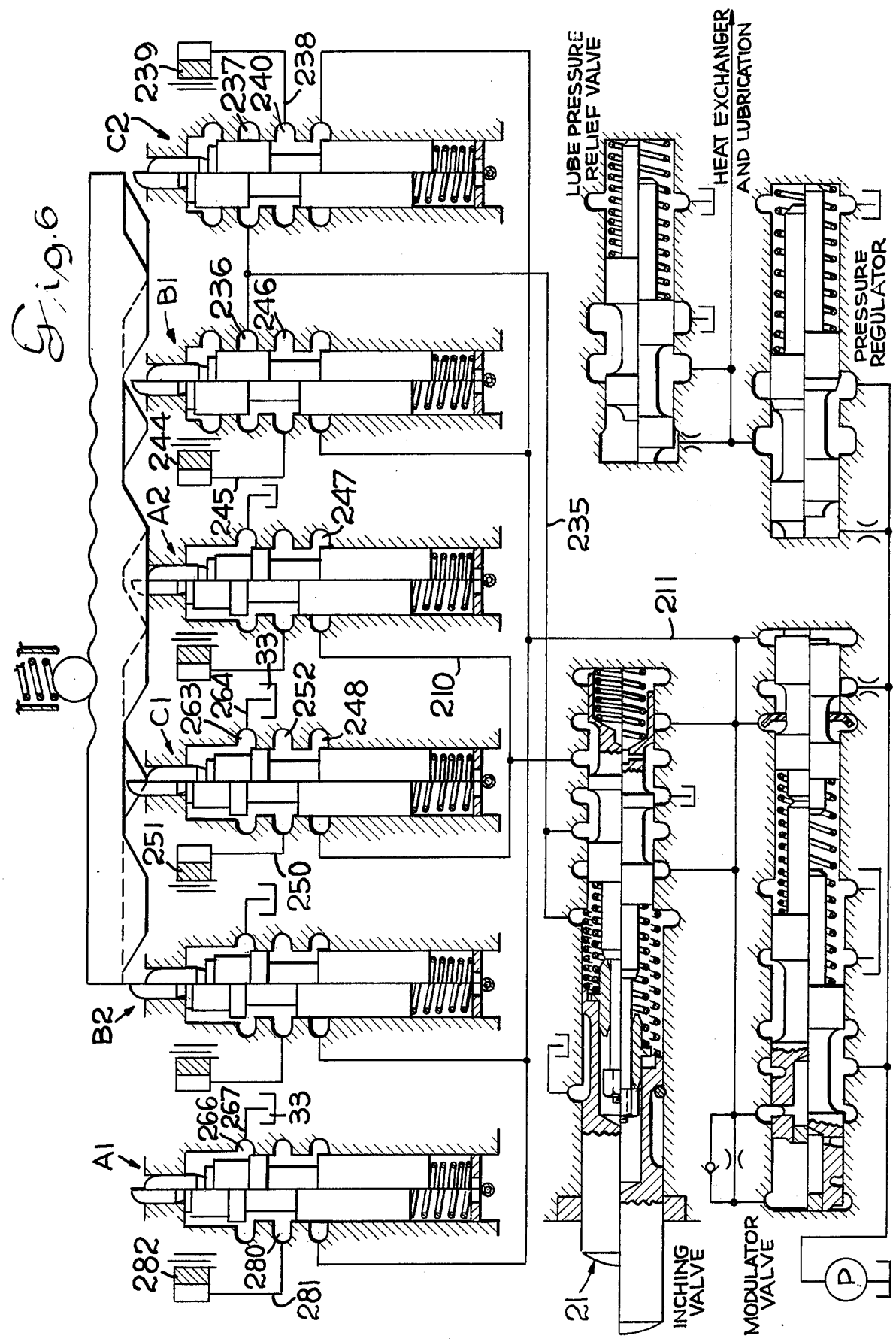
FIG. 6 is a circuit diagram of the hydraulic stack valve assembly in a hydraulic system wherein all of the flow control valves are used.
Figure 7:
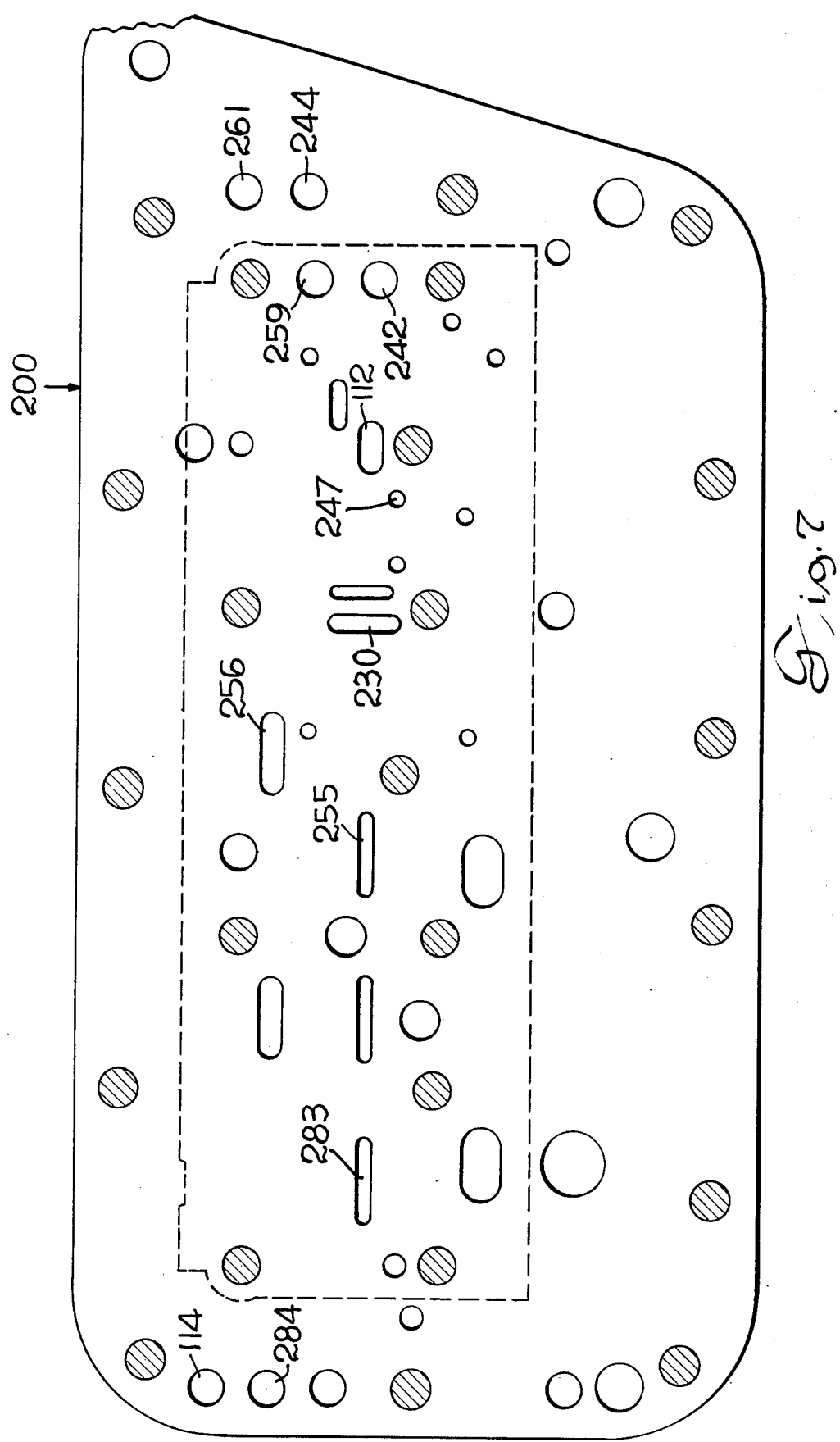
FIG. 7 is a view similar to the view shown in FIG. 4 in which an alternate flow director plate is used to accommodate the use of all of the flow control valves in the circuit shown in FIG. 6.

The valve cover 106 and the valve body 107 are also adapted for use with a flow divider plate 200 as shown in FIG. 7. FIG. 6 shows a hydraulic system using the flow divider plate 200 in which all the flow control valves are used in the valve body 107.

The modulated hydraulic fluid line 211 is connected to all the flow control valves A1, B2, B1 and C2. The manually controlled hydraulic fluid pressure line 210, however, is connected through the inching valve 21. The passages through the valve cover 106, the flow director plate 200 and the valve body 107 are generally the same as previously described for the previous valve assembly except the flow divider plate is different. A fluid modulating hydraulic line 211 supplies fluid to the inching valve 21 which in turn supplies fluid through the manually controlled fluid pressure line 210. The hydraulic line 210 includes the passage 227 in the valve cover and the port 230 in the flow director plate 200, as shown in FIG. 7, which is connected to the passage 111 in the valve body 107. This supplies fluid from the inching valve to the valves C1 and A2.

The braking pressure for B1 and C2 is supplied through the inching valve 21 through the hydraulic line 235 which connects through port 236 in valve B1 and port 237 in valve C2. The hydraulic line 235 in FIG. 6 includes the passage 4 in the valve cover 106 of FIG. 5 which is connected to the opening 247 in the flow director plate 200 to the passage 101 of the valve body 107 shown in FIG. 2.

The hydraulic line 238 is connected between the hydraulic actuator 239 and the port 240 on the flow control valve C2. The port 240 and hydraulic line 238 include the passage 241 of the valve body 107 in FIG. 2 and the port 242 in the flow divider plate 200 which is in communication with the passage 243 in the valve cover 106 and port 244 of the flow director plate 200 and a passage in the power shift transmission which leads to the hydraulic actuator 239 which is controlled by the flow control valve C2.

The hydraulic actuator 244 is connected through the hydraulic fluid line 245 from port 246 in the hydraulic flow control valve B1. The port 246 and the hydraulic control line 245 are formed by the passage 2 in the valve body 107, opening 112 in the flow director plate 200 which in turn is connected to passage 202 in the valve cover 106, shown in FIG. 5, and opening 114 of the flow director plate 200, as shown in FIG. 7, to a passage in the transmission and hydraulic actuator 244.

Figure 4:
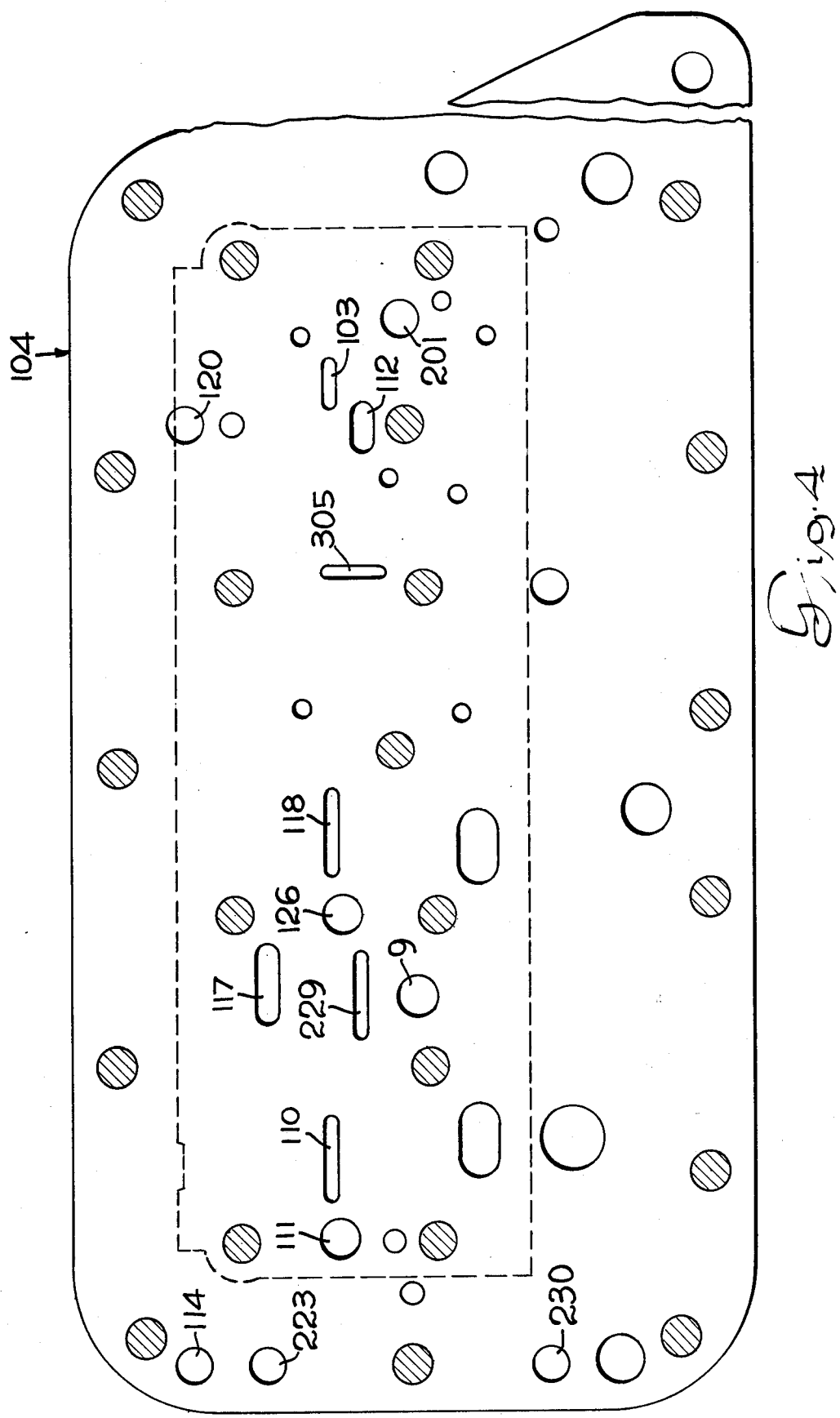
FIG. 4 is a cross section view taken on line IV—IV of FIG. 3 showing the openings through the flow director plate for the circuit shown in FIG. 1.

The flow control valve A2 is connected to the hydraulic actuator 82 and sump as described for the flow director plate 104, as shown in FIG. 4.

The flow control valves C1 and A2 are connected from the inching valve 21 through hydraulic fluid passage 210 and port 248 of the flow control valve C1 and port 247 of flow control valve A2. The hydraulic fluid passage 210 and port 248 and 247 include the passage 227 in valve cover 106, shown in FIG. 5, connected to the port 230 in the flow director plate to the passage 111 in the valve body 107, shown in FIG. 2.

The hydraulic line 250 is connected to the hydraulic actuator 251 and to the port 252 in the flow control valve C1. The port 252 and hydraulic line 250 include passage 253 in the valve body 107 shown in FIG. 2, passage 254 in the valve cover 106 shown in FIG. 5, and connecting ports 255 and 256 in the flow director plate 200 shown in FIGS. 5 and 7, and passage 258 in the valve body 107 shown in FIG. 2 leading to opening 259 in the flow divider plate 200 shown in FIG. 7. Opening 259 is connected to the passage 260 in the valve cover 106 shown in FIG. 5, and port 261 in the flow director plate shown in FIG. 7, which is connected to a passage in the power shift transmission for connection to the hydraulic actuator 251.

The port 263 is connected to sump 33 through the hydraulic passage 264. The port 263 and hydraulic passage 264 include the sump port 265 as shown in the valve body 107 of FIG. 2.

The flow control valve A1 includes a port 266 and hydraulic fluid line 267 connected to sump 33. The port 266 and hydraulic line 267 are illustrated by the vent 268 in the valve body 107 shown in FIG. 2 which vents to the inside of the valve body and drains into the transmission as previously described for the other flow control valves.

The port 280 and hydraulic line 281 are connected to the hydraulic actuator 282 as shown in FIG. 6. The port 280 and the hydraulic line 281 include the passage 279 in the valve body 107 shown in FIG. 2 and the opening 283 in the flow director plate 200 shown in FIG. 7 and passage 108 in the valve cover 106 shown in FIG. 5 which in turn is connected through the opening 284 of the flow director plate 200 shown in FIG. 7.

Accordingly, the valve cover 106 and the passages and valves therein form a subassembly which is the same for the first and the second stack valve assemblies described herein. The valve body is also the same although dummy spools have been used in the previous description of the stack valve assembly and these dummy spools have been replaced by spools having lands and grooves to direct the flow to the hydraulic actuators through flow control valves A1, C1 and C2 in the second stack valve assembly. The changes made were primarily in the flow director plate 200 as shown in FIG. 7, as compared to the flow director plate 104 as shown in FIG. 4, for the previously described hydraulic stack valve assembly.

The stack valve assemblies are assembled by placing the desired flow director plate between the valve body and the valve cover, and the stack valve assembly is then bolted together by means of a plurality of bolts.

The embodiments of the invention in which an exclusive property or privilege is claimed are defined as follows:

1. A hydraulic stack valve assembly comprising, a valve body, a valve cover and a flow director plate selectively and alternately positioned intermediate said valve body and said valve cover, means removably fastening said valve assembly together, inlet passage means in said valve assembly adapted for connection to a source of pressurized fluid, hydraulic actuator passage means in said valve assembly adapted for connection to at least one hydraulic actuator, sump passage means in said valve assembly adapted for connection to a sump, said valve body defining a plurality of flow control valves, a valve spool in each of said flow control valves, at least one of said valve spools defining lands and grooves for controlling fluid flow in said flow control valve, said valve cover including a pressure regulator valve and a pressure modulating valve to control the fluid pressure in said valve, connecting passage means in said valve body connecting said flow control valves, joining passage means joining said valves in said valve cover, said flow director plate defining openings permitting fluid flow between portions of said connecting passage means and said joining passage means of said valve assembly, actuating means selectively operating said flow control valves for selective communication with said hydraulic actuator.

2. A hydraulic stack valve assembly as set forth in claim 1 wherein at least one of said spool valves includes a dummy spool for inactivating the mating spool valve.

3. A hydraulic stack valve assembly as set forth in claim 1 wherein said flow director plate blocks flow of fluid from said joining passage means to said connecting passage means and to at least one of said flow control valves.

4. A hydraulic stack valve assembly as set forth in claim 1 wherein said flow director plate includes means defining openings for connecting said joining passage means to all of said connecting passage means in said valve body to supply pressurized fluid to all of said flow control valves for operation of said valve assembly.

5. A hydraulic stack valve assembly as set forth in claim 1 wherein said flow director plate defines partition means separating connecting passages in said valve body from joining passages in said valve cover and defining openings for communication between the connecting passages in said valve body and the joining passages in said valve cover for selective transmission of fluid from said valve cover to said valve body.

6. A hydraulic stack valve assembly as set forth in claim 1 including means on said valve assembly adapted for mounting said valve assembly on a transmission housing.

7. A hydraulic stack valve assembly as set forth in claim 1 wherein said flow control valves including a spool in each of said valves defining lands and grooves for selectively controlling the flow of fluid through said flow control valves.

8. A hydraulic stack valve assembly as set forth in claim 1 wherein said flow director plate defines openings permitting the flow of pressurized fluid from said inlet passage and said joining passages to at least one of said flow control valves, means in said flow director plate defining a partition for blocking the flow from said inlet passage and said joining passages in said valve cover to the remainder of said flow control valves in said valve body.

9. A hydraulic stack valve assembly as set forth in claim 1 wherein said flow director plate defines partitions blocking flow from said inlet passage and said joining passages to at least half of the flow control valves in said valve body, said flow director plate defining openings for directing fluid flow from said inlet passage and said joining passages in said valve cover to the remaining of said flow control valves in said valve body.

10. A hydraulic stack valve assembly as set forth in claim 1 wherein said flow director plate defines openings allowing flow of pressurized fluid from said pressure control valves in said valve cover to said flow control valves in said valve body, means defining holes in said valve body, said valve cover and said flow director plate for reception of bolts for removably fastening said valve assembly together.

* * * * *